(12) United States Patent
Nichols et al.

(10) Patent No.: US 6,842,829 B1
(45) Date of Patent: Jan. 11, 2005

(54) METHOD AND APPARATUS TO MANAGE INDEPENDENT MEMORY SYSTEMS AS A SHARED VOLUME

(75) Inventors: Charles F. Nichols, Wichita, KS (US); Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 264 days.

(21) Appl. No.: 10/006,162

(22) Filed: Dec. 6, 2001

(51) Int. Cl.[7] .............................................. G06F 12/00
(52) U.S. Cl. ........................ 711/147; 711/114; 714/6
(58) Field of Search ................................ 711/114, 147; 714/6

(56) References Cited

U.S. PATENT DOCUMENTS

| | | | |
|---|---|---|---|
| 5,606,706 A | | 2/1997 | Takamoto et al. |
| 5,640,530 A | | 6/1997 | Beardsley et al. |
| 5,742,792 A | * | 4/1998 | Yanai et al. .................. 711/162 |
| 5,895,485 A | | 4/1999 | Loechel et al. |
| 6,044,444 A | | 3/2000 | Ofek |
| 6,085,333 A | * | 7/2000 | DeKoning et al. .............. 714/7 |
| 6,101,497 A | * | 8/2000 | Ofek ........................... 707/10 |
| 6,219,751 B1 | * | 4/2001 | Hodges ....................... 711/114 |
| 6,321,298 B1 | * | 11/2001 | Hubis ......................... 711/124 |
| 6,349,357 B1 | * | 2/2002 | Chong, Jr. ................... 711/111 |
| 6,442,551 B1 | | 8/2002 | Ofek |
| 6,557,079 B1 | | 4/2003 | Mason, Jr. et al. |

* cited by examiner

Primary Examiner—Donald Sparks
Assistant Examiner—Christian P. Chace
(74) Attorney, Agent, or Firm—Yee & Associates

(57) ABSTRACT

A switched architecture is provided to allow controllers to manage physically independent memory systems as a single, large memory system. The switched architecture includes a path between switches of controllers for inter-controller access to memory systems and input/output interfaces in a redundant controller environment. Controller memory systems are physically independent of each other; however, they are logically managed as a single, large memory pool. Cache coherency is concurrently maintained by both controllers through a shared locking mechanism. Volume Logical Block Address extents or individual cache blocks can be locked for either shared or exclusive access by either controller. There is no strict ownership model to determine data access. Access is managed by the controller in the pair that receives the access request. When a controller is removed or fails, a surviving controller may take appropriate action to invalidate all cache data that physically resides in the failed or missing controller's memory systems. Cached write data may be mirrored between redundant controllers to prevent a single point of failure with respect to unwritten cached write data.

9 Claims, 6 Drawing Sheets

METHOD AND APPARATUS TO MANAGE INDEPENDENT MEMORY SYSTEMS AS A SHARED VOLUME

BACKGROUND OF THE INVENTION

1. Technical Field

The present invention is directed generally toward computer storage systems and, more particularly, toward a method and apparatus for managing independent storage controller memory systems as a single memory system for the purposes of allowing shared storage volume access.

2. Description of the Related Art

Redundant Array of Independent Disks (RAID) is a disk subsystem that increases performance and provides fault tolerance. RAID is a set of two or more hard disks and a specialized disk controllers that contain the RAID functionality. RAID can also be implemented via software only, but with less performance, especially when rebuilding data after a failure. RAID improves performance by disk striping, which interleaves bytes or groups of bytes across multiple drives, so more than one disk is reading and writing simultaneously. Fault tolerance is achieved by mirroring or parity. Mirroring involves duplication of the data on two drives. A failed drive can be hot swapped with a new one, and the RAID controller automatically rebuilds the lost data from the mirrored drive.

Dual, independent storage controllers are required to provide full data path redundancy to host computer systems. The controllers share access to the disk drives via their respective interface ports. The controllers present the data on the drives to one or more host systems as one or more logical volumes. However, simultaneous or interleaved access to data on a given volume from a plurality of controllers has associated cache coherency and data access latency problems. The coherency problems arise because each controller has an independent memory system for caching data from the volumes. Data access latency problems arise because the controllers must make their respective caches coherent when the two controllers interleave access to the data in the volumes.

One solution to the problems in the prior art is to not allow the controllers to simultaneously access the data. However, this approach restricts simultaneous data access to hosts connected to a single controller. Another solution is to share a common data cache between a plurality of controllers. This approach is lacking because the common data cache is a single point of failure. Yet another solution is to establish an ownership model where controllers trade off the data access privileges. However, there are latencies associated with ownership transfer. These latencies are visible to the host computer systems.

Therefore, it would be advantageous to provide an improved method and apparatus for managing cache memory for a storage volume.

SUMMARY OF THE INVENTION

The present invention provides a switched architecture to allow controllers to manage physically independent memory systems as a single, large memory system. The switched architecture includes a path between switches of controllers for inter-controller access to memory systems and input/output interfaces in a redundant controller environment. Controller memory systems are physically independent of each other; however, they are logically managed as a single, large memory pool. Cache coherency is concurrently maintained by both controllers through a shared locking mechanism. Volume Logical Block Address extents or individual cache blocks can be locked for either shared or exclusive access by either controller. There is no strict ownership i: model to determine data access. Access is managed by the controller that receives the access request. When a controller is removed or fails, a surviving controller may take appropriate action to invalidate all cache data that physically resides in the failed or missing controller's memory systems. Cached write data will be mirrored between redundant controllers to prevent a single point of failure with respect to unwritten cached write data.

BRIEF DESCRIPTION OF THE DRAWINGS

The novel features believed characteristic of the invention are set forth in the appended claims. The invention itself however, as well as a preferred mode of use, further objects and advantages thereof will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

Figure 1:
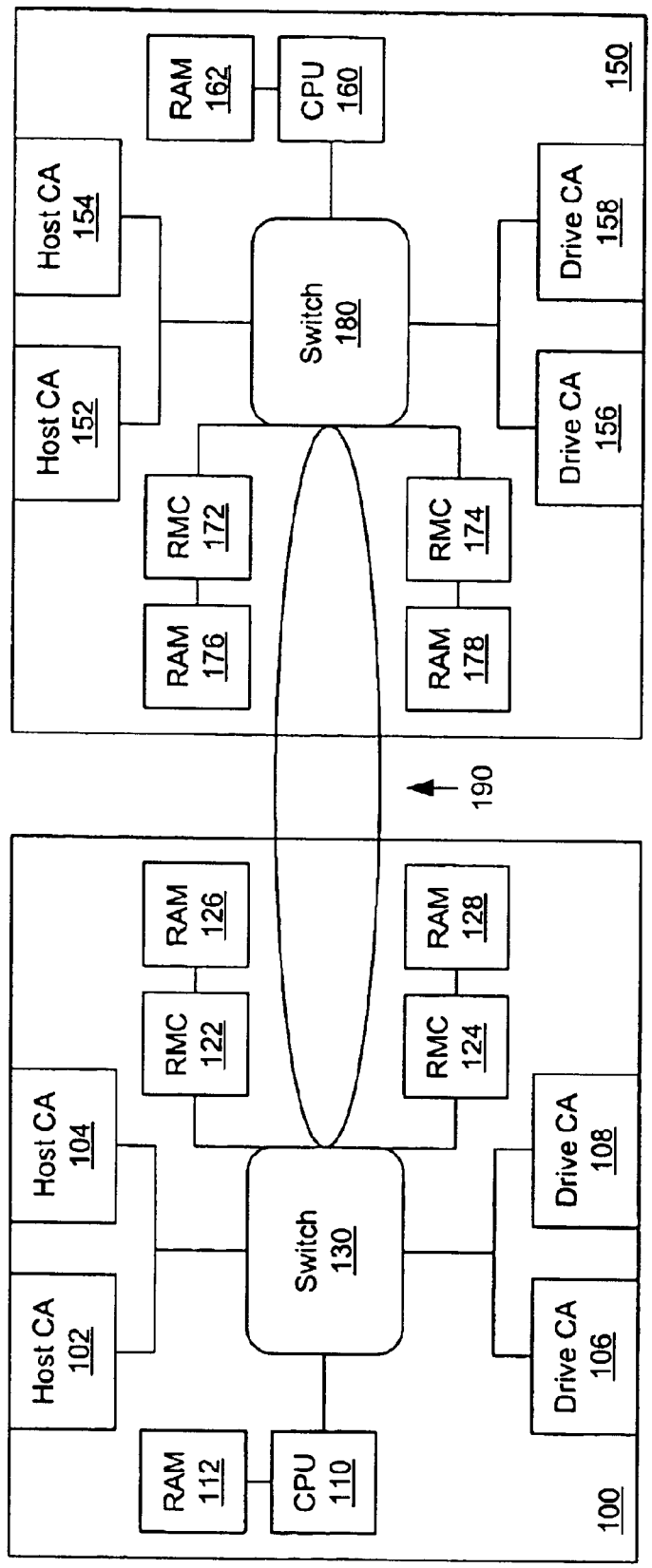
FIG. 1 is a block diagram of a switched controller architecture in accordance with a preferred embodiment of the present invention.

With reference now to the figures and in particular with reference to FIG. 1, a block diagram of a switched controller architecture is depicted in accordance with a preferred embodiment of the present invention. The architecture includes a first controller 100 and a second controller 150 to provide full path redundancy to host computer systems. Controller 100 includes host channel adapters (CA) 102, 104 and drive channel adapters 106, 108. The host channel adapters are the physical connections between the internal bus and the host interface. The internal bus may be, for example, an INFINIBAND bus. While the example shown in FIG. 1 is an INFINIBAND architecture, controllers 100, 150 may be any other switched architecture. "INFINIBAND" is a trademark of System I/O, Inc. DBA InfiniBand Trade Association. Portland, Oreg. The drive channel adapters are the physical connections between the internal bus and the drive interface.

Controller 100 also includes central processor unit (CPU) 110. The CPU may have an associated random access memory (RAM) 112 as a working memory. Further, controller 100 includes remote memory controllers (RMC) 122, 124. An RMC is the control hardware for managing the connection to a memory. RMC 122 manages the connection to RAM 126 and RMC 124 manages the connection to RAM 128.

Host channel adapters 102, 104, drive channel adapters 106, 108, CPU 110, and remote memory controllers 122, 124 are connected using switch 130. The switch is a semi-intelligent hardware component with multiple ports. A request received on any port can be directly routed to any other port on the switch. In the example of an Infiniband controller, switch 130 is an Infiniband switch.

Controller 150 includes host channel adapters 152, 154 and drive channel adapters 156, 158. Controller 150 also includes CPU 160. The CPU may have an associated random access memory (RAM) 162 as a working memory. Further, controller 150 includes remote memory controllers 172, 174. RMC 172 manages the connection to RAM 176 and RMC 174 manages the connection to RAM 178. Host channel adapters 152, 154, drive channel adapters 156, 158, CPU 160, and remote memory controllers 172, 174 are connected using switch 180.

In accordance with a preferred embodiment of the present invention, the switched architecture includes path 190 between switch 130 and switch 180. Path 190 is a switch-to-switch path that allows for inter-controller access to memory systems and input/output (I/O) interfaces in a redundant controller environment. For example, when a request is received on host CA 102, CPU 110 may access a device via drive CA 156 through path 190. As a further example, when a request is received on host CA 154, CPU 160 may access RAM 128 via RMC in 124 through path 190.

Switch-to-switch path 190 may be provided through edge connectors. Alternatively, path 190 may be provided through a wired connection between controller cards. Other techniques for providing path 190 may also be used within the scope of the present invention.

Those of ordinary skill in the art will appreciate that the hardware depicted in FIG. 1 may vary. For example, each controller may include more or fewer host channel adapters. The controllers may also include more or fewer drive channel adapters depending on the implementation. While the example depicted in FIG. 1 shows two memory controllers 122, 124 and two random access memories 126, 128, more or fewer memories and associated controllers may be used. In addition, a controller may include a plurality of central processing units. The depicted example is not meant to imply architectural limitations with respect to the present invention.

The controller memory systems are physically independent of each other. However, according to a preferred embodiment of the present invention they are logically managed as a single, large memory pool. Cache coherency is concurrently maintained by both controllers through a shared locking mechanism. Volume Logical Block Address (LBA) extents or individual cache blocks can be locked for either shared or exclusive access by either controller. There is no strict ownership model to determine data access. Access is managed by the controller that receives the access request. When a controller is removed or fails, a surviving controller may take appropriate action to invalidate all cache data that physically resides in the failed or missing controller's memory systems. Cached write data may be mirrored between redundant controllers to prevent a single point of failure with respect to unwritten cached write data.

Figure 2A:
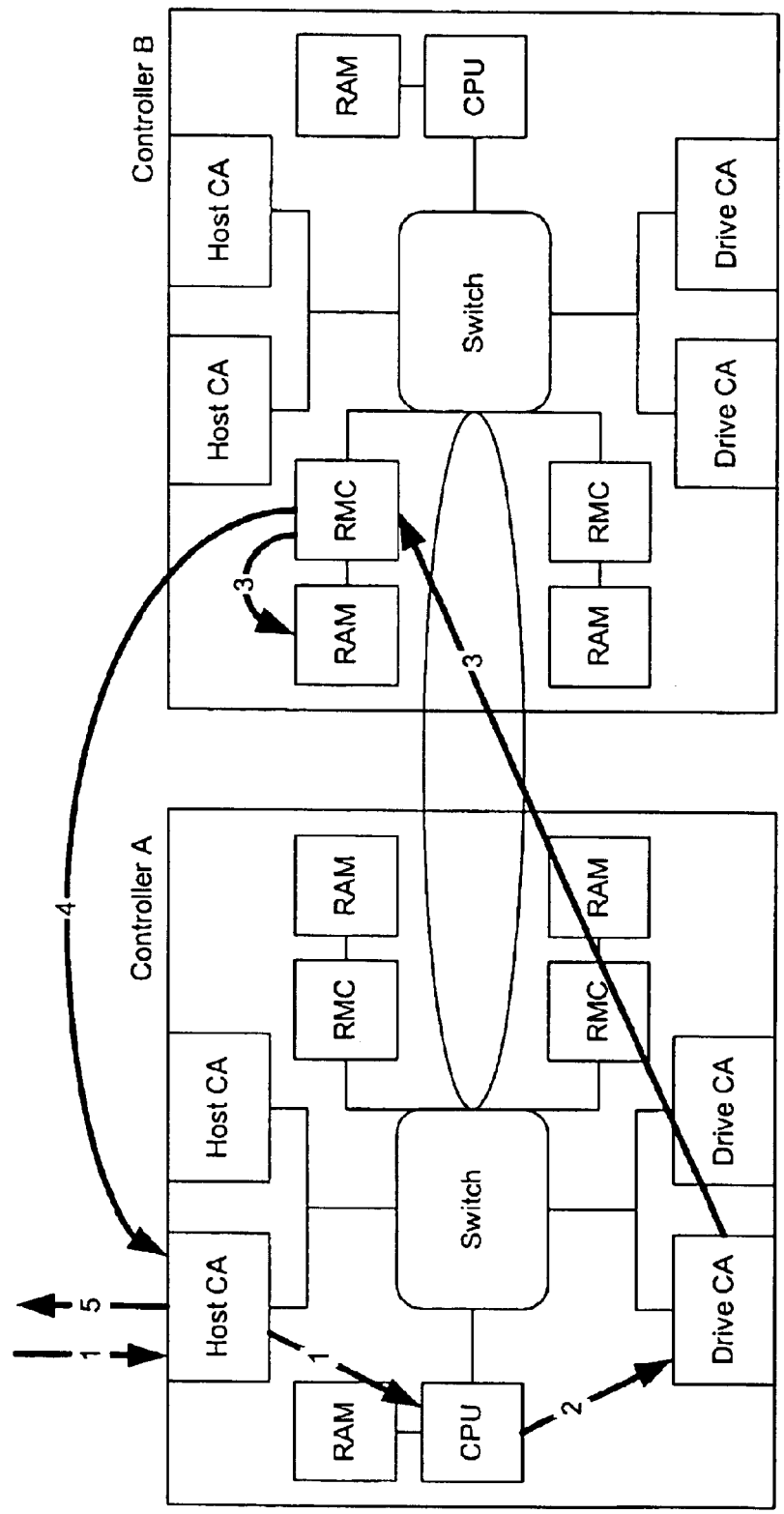
FIGS. 2A and 2B are block diagrams illustrating example examples of shared cache read sequences in accordance with a preferred embodiment of the present invention.
Figure 2B:
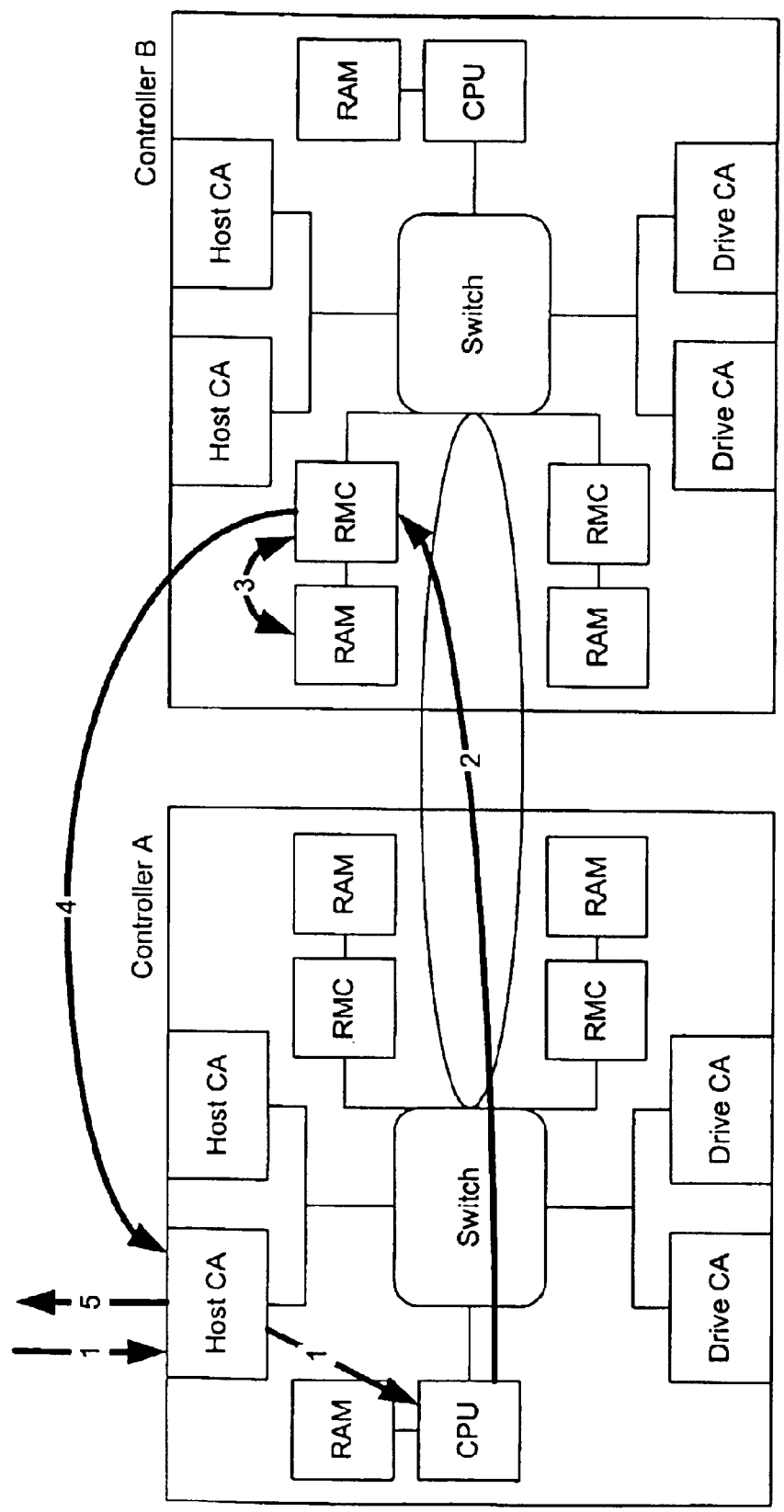

With reference now to FIGS. 2A and 2B, block diagrams illustrating examples of shared cache read sequences are shown in accordance with a preferred embodiment of the present invention. Particularly, with respect to FIG. 2A, a read request is processed according to the following steps:

1. A read request is received by Controller A.
2. Controller A allocates memory buffers for the read data. Because the logical cache memory pool resides on both controllers, the memory buffer could be allocated from either controller's physical memory pool. In the example shown in FIG. 2A, the buffer for the read request received by Controller A happens to be on Controller B. By definition, however, this buffer could be allocated on either controller. It is during this allocation phase that cache coherency must be maintained between the controllers. The LBA extent for this read is marked as locked, such that other reads to the same LBA on either controller is forced to wait for the disk read to complete for the read received by Controller A. Once the memory buffer is allocated, Controller A maps the request to the appropriate disk drives and initiates reads (data transfers) via the appropriate drive CA from the disk drives. The reads do not necessarily have to occur through the drive CA on the controller that received the original read request.
3. The drive CA begins to transfer the data to the appropriate memory pool. This step facilitates future cache read hits for this data. Because of the concurrent cache coherency management inherent in this approach, subsequent reads of the same LBA to either controller would discover the data in the logical cache pool.
4. Data is transferred to the host CA on Controller A that received the request.
5. Controller A directs command status to be returned through the originating CA on that controller.

Turning now to FIG. 2B, a read request for which the data exists in cache is processed according to the following steps:

1. A read request is received by Controller A.
2. Controller A discovers the LBA in the logical cache pool and initiates reads from the memory on Controller B.
3. The RMC on Controller B reads the data from memory.
4. Data is transferred to the host CA on Controller A that received the request.
5. Controller A directs command status to be returned through the originating CA on the controller.

Figure 3A:
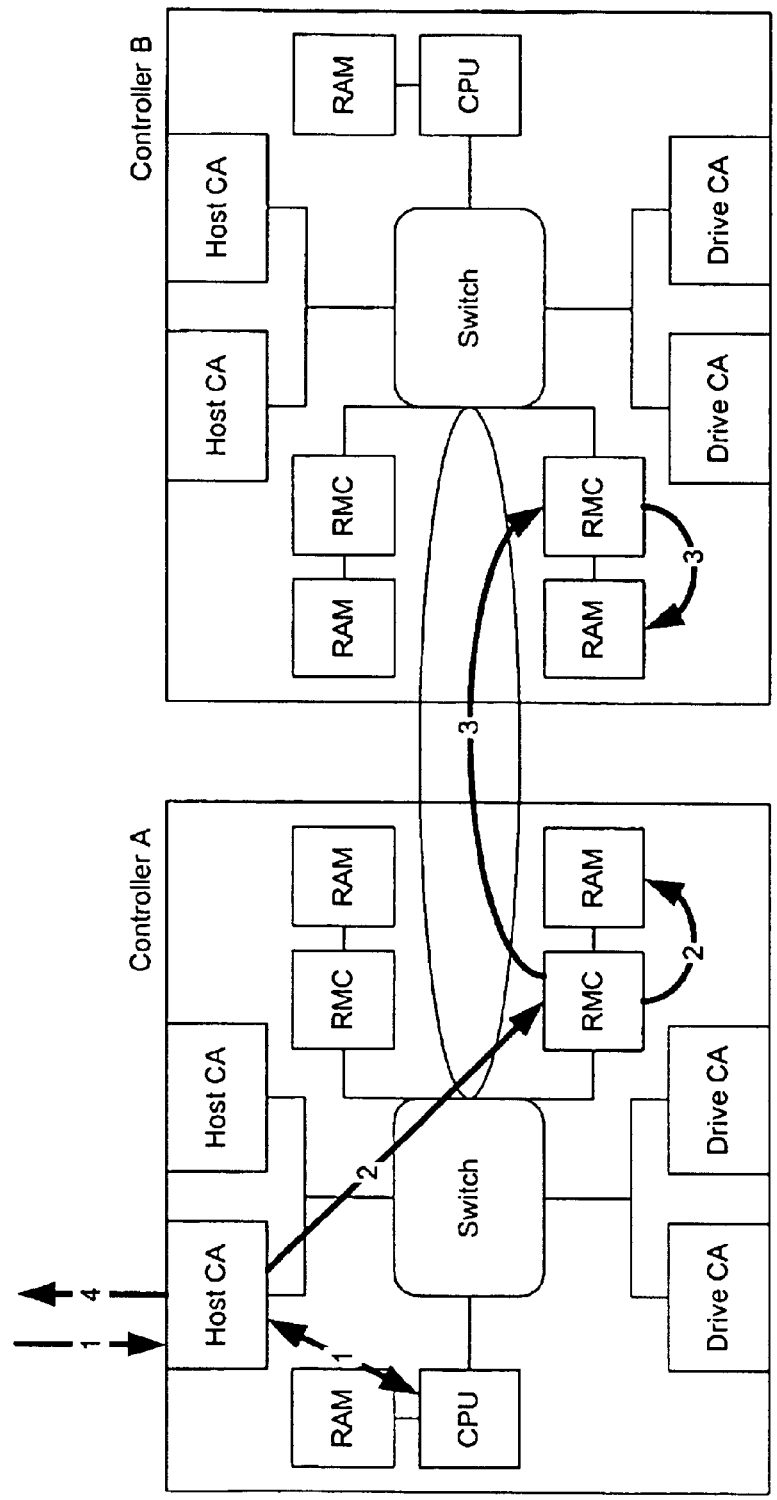
FIGS. 3A and 3B are block diagrams illustrating example examples of shared cache write sequences in accordance with a preferred embodiment of the present invention.
Figure 3B:
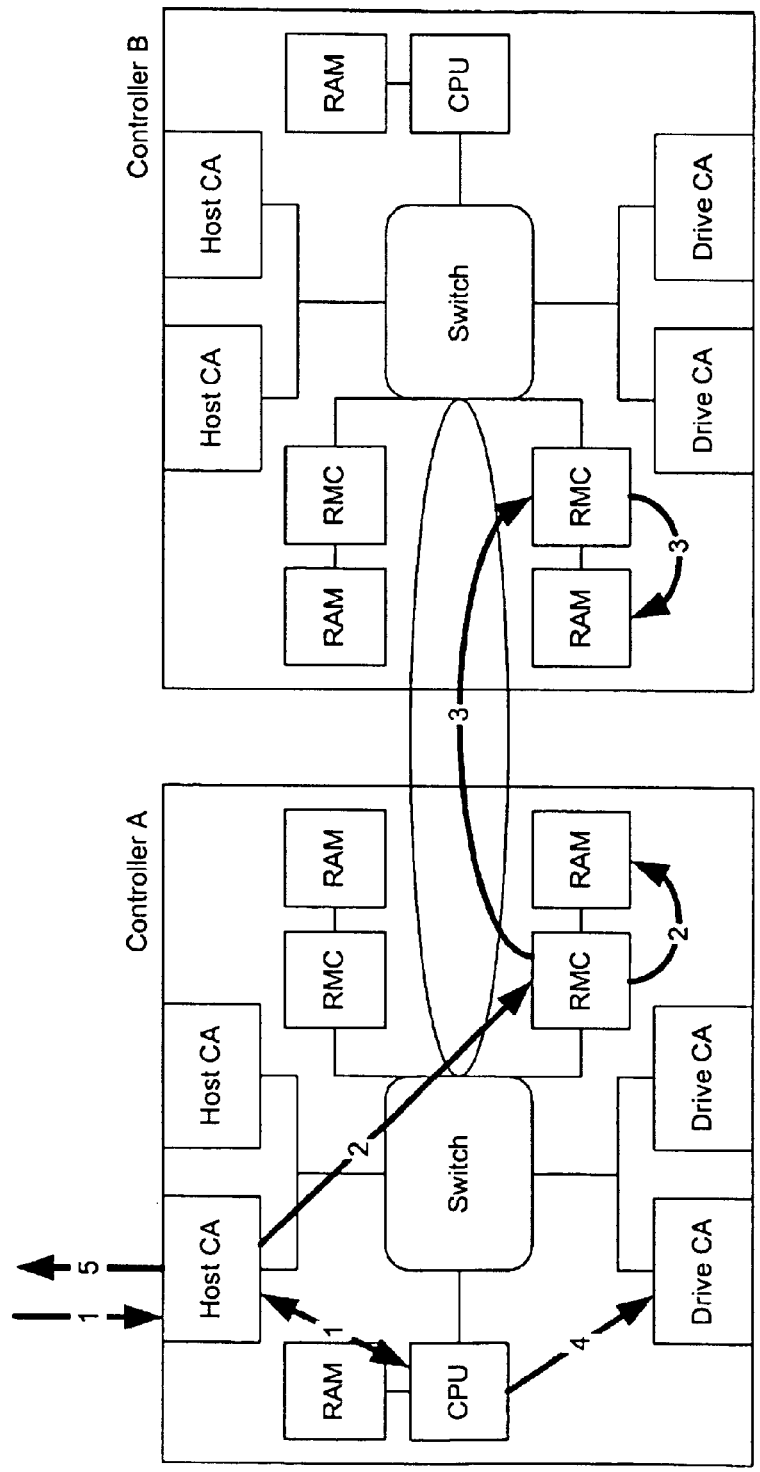

With reference now to FIGS. 3A and 3B, block diagrams illustrating examples of shared cache write sequences are shown in accordance with a preferred embodiment of the present invention. Particularly, with respect to FIG. 3A, a write request is processed with write-back caching according to the following steps:

1. A write request is received by Controller A. Controller A allocates memory buffers for the request. Two buffers are allocated, one on Controller A and another on Controller B. These two buffers serve as mirrors of each other. In order to maintain cache coherency, the LBA extent is locked to prevent other access to this data by requests received by either controller.
2. The data transfer is initiated by Controller A. The originating host CA begins to transfer data to the primary data buffer via the appropriate RMC. Although the example in FIG. 3 shows that the primary data buffer resides on Controller A, the primary data buffer may reside on either controller. However, it is required that the mirror buffer reside on the controller that does not contain the primary data buffer.

3. Data is transferred to the appropriate RMC and data buffer on the alternate controller.
4. Controller A directs command status to be returned through the originating CA.

Turning now to FIG. 3B, a write request is processed with write-through caching according to the following steps (note that write cache mirroring may not occur during write-through requests):

1. A write request is received by Controller A. Controller A allocates memory buffers for the request. (Optional) Two buffers are allocated, one on Controller A and another on Controller B. These two buffers serve as mirrors of each other. In order to maintain cache coherency, the LBA extent is locked to prevent other access to this data by requests received by either controller.
2. The data transfer is initiated by Controller A. The originating host CA begins to transfer data to the primary data buffer via the appropriate RMC.
3. (Optional) Data is transferred to the appropriate RMC and data buffer on the alternate controller.
4. Controller A directs write completion to the disk drives.
5. Controller A directs command status to be returned through the originating CA.

Figures 4, 5:
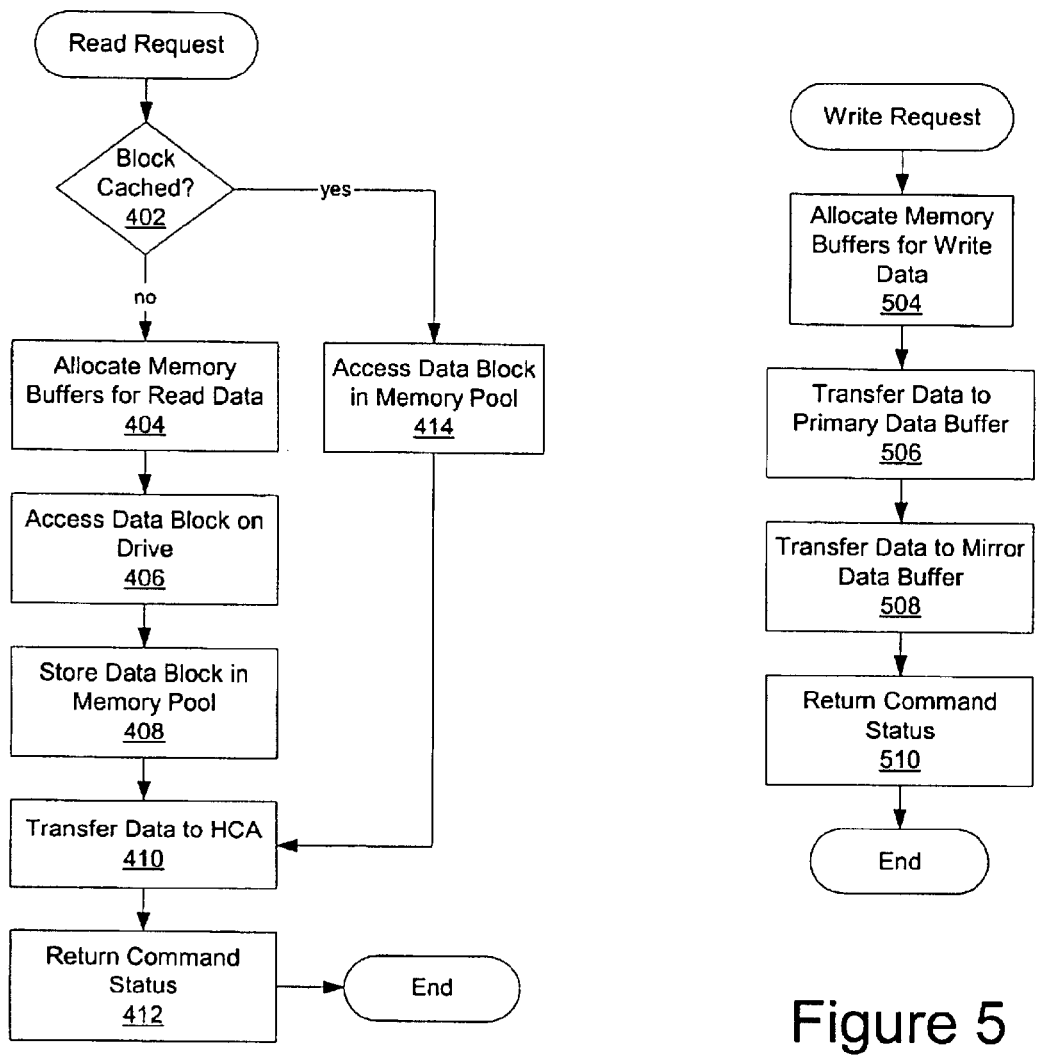
FIG. 4 is a flowchart illustrating the processing of a read request in accordance with a preferred embodiment of the present invention.
FIG. 5 is a flowchart illustrating the processing of a write request in accordance with a preferred embodiment of the present invention.

Next, with reference to FIG. 4, a flowchart illustrating the processing of a read request is shown in accordance with a preferred embodiment of the present invention. The process begins when a read request is received and a determination is made as to whether the data block is cached (step 402). If the data block is not cached, the process allocates memory buffers for read data (step 404), accesses the data block on the drive (step 406), and stores the data block in the memory pool (step 408). The data block may be accessed through a drive CA on any controller connected through the switch path. Furthermore, the memory buffers may be allocated and stored on a memory system of any controller connected through the switch path.

Then, the process transfers data to the host CA (step 410), returns command status (step 412), and ends. If the data block is cached in step 402, the process accesses the data block in the memory pool (step 414) and proceeds to step 410 to transfer the data to the host CA, return command status (step 412), and end.

Turning now to FIG. 5, a flowchart is shown illustrating the processing of a write request in accordance with a preferred embodiment of the present invention. The process begins when a write request is received and the process allocates memory buffers for write data (step 504) and transfers data to the primary data buffer (step 506). Thereafter, the process transfers data to the mirror data buffer (step 508). The primary buffer need not reside on the controller that receives the write request. However, the mirror buffer must reside on a controller, which does not contain the primary buffer to avoid a single point of failure. Next, the process returns command status (step 510) and ends. Alternatively, if the volume is configured for write-through caching, the controller directs write completion to the disk drives before returning status in step 510.

Thus, the present invention solves the disadvantages of the prior art by utilizing the switched architecture of the controllers to treat physically independent memory systems as a single, large logical memory system. The switched architecture facilitates direct data transfers to components that are not on board with respect to a single controller. From a host perspective, this approach eliminates a strict ownership model within a redundant controller storage environment. A host can access data from either storage controller without being exposed to the ownership change latency associated with moving ownership between controllers. Because there are no preferred access paths, I/O performance to a given volume is nearly identical on both controllers, thus eliminating latency involved in directing access from a non-preferred controller to a preferred controller. The present invention also provides a shared cache system without excess latency. The shared cache volume also is not a single point of failure, because it allows mirroring between independent memory systems.

What is claimed is:

1. An apparatus, in a first storage controller, comprising:
   a host adapter that provides a connection to a host;
   a processor;
   a first memory;
   a first memory controller that controls access to the first memory;
   a drive adapter that provides a connection to a storage device;
   a first switch that connects the host adapter the processor, the first memory controller, and the drive adapter; and
   a switch-to-switch path that connects the first switch to a second switch on a second storage controller,
   wherein the host adapter receives a read request for a data block; and
   wherein the processor allocates a memory buffer for the data block from a memory pool that includes the first memory on the first storage controller and a second memory on the second storage controller, wherein the memory buffer resides in the second memory; retrieves the data block from a storage device; and caches the data block in the memory buffer via the switch-to-switch path.

2. The apparatus of claim 1, wherein the processor retrieves the data block from the storage device using the drive adapter via the first switch.

3. The apparatus of claim 1, wherein the processor retrieves the data block from the storage device using a drive adapter on the second storage controller via the switch-to-switch path.

4. An apparatus in a first storage controller, comprising:
   a host adapter that provides a connection to a host:
   a processor;
   a first memory controller that controls access to the first memory;
   a drive adapter that provides a connection to a storage device;
   a first switch that connects the host adapters the processor, the first memory controller, and the drive adapter; and
   a switch-to-switch path that connects the first switch to a second switch on a second storage controller,
   wherein the host adapter receives a mad request for a data block; and
   wherein the processor retrieves the data block from a memory pool that includes the first memory on the first storage controller and a second memory on the second storage controller, wherein the data block resides in the second memory.

5. A apparatus in a first storage controller, comprising:

a host adapter that provides a connection to a host;

a processor;

a first memory;

a first memory controller that controls access to the fist memory;

a drive adapter that provides a connection to a storage device;

a first switch that connects the host adapter, the processor, the first memory controller, and the drive adapter; and a switch-to-switch path that connects the first switch to a second switch on a second storage controller, wherein the host adapter receives a write request for a data block; and wherein the processor allocates a primary data buffer for the data block and a mirror data buffer for the data block, wherein the primary data buffer resides on one of the first storage controller and the second storage controller and the mirror data buffer resides on the other of the first storage controller and the second storage controller;

wherein the processor stores write data for the data block in the primary data buffer; and wherein the processor mirrors the write data in the mirror data buffer.

6. The apparatus of claim 5, wherein the primary data buffer resides on the second storage controller and the processor stores the write data in the primary data buffer via the switch-to-switch path.

7. The apparatus of claim 5, wherein the mirror data buffer resides on the second storage controller and the processor stores the write data in the mirror data buffer via the switch-to-switch path.

8. The apparatus of claim 5, wherein the processor writes the write data to a storage device using the drive adapter via the first switch.

9. The apparatus of claim 5, wherein the processor writes the write data to a storage device using a drive adapter on the second storage controller via the switch-to-switch path.

* * * * *